United States Patent [19]

Kurihara et al.

[11] Patent Number: 4,762,672

[45] Date of Patent: Aug. 9, 1988

[54] FAST BREEDER REACTOR

[75] Inventors: Kunitoshi Kurihara, Katsuta; Katsuyuki Kawashima; Ryoji Masumi, both of Hitachi; Kazuo Azekura, Toukai, all of Japan

[73] Assignee: Hitachi, Ltd., Tokyo, Japan

[21] Appl. No.: 787,390

[22] Filed: Oct. 15, 1985

[30] Foreign Application Priority Data

Oct. 12, 1984 [JP] Japan ................. 60-212532

[51] Int. Cl.⁴ .............................................. G21C 7/10
[52] U.S. Cl. ...................... 376/333; 376/327; 376/334
[58] Field of Search ............... 376/327, 333, 233, 334

[56] References Cited

U.S. PATENT DOCUMENTS

| 2,861,035 | 11/1958 | Zinn et al. ............... 376/327 |
| 2,879,216 | 3/1959 | Hurwitz et al. . |
| 3,081,248 | 3/1963 | Grant ..................... 376/333 |
| 3,679,545 | 7/1972 | Leirvik .................. 376/327 |
| 3,773,617 | 11/1973 | Marmonier et al. ........ 376/333 |
| 3,988,203 | 10/1976 | Kuzavkov et al. ......... 376/334 |

FOREIGN PATENT DOCUMENTS

| 0066264 | 12/1982 | European Pat. Off. . |
| 0151969 | 8/1985 | European Pat. Off. . |
| 2445370 | 4/1976 | Fed. Rep. of Germany ...... 376/333 |
| 2289030 | 5/1976 | France . |
| 50-65794 | 6/1975 | Japan . |
| 51-49398 | 4/1976 | Japan ..................... 376/327 |
| 51-69797 | 6/1976 | Japan ..................... 376/327 |
| 0047196 | 4/1977 | Japan ..................... 376/327 |
| 0148693 | 12/1978 | Japan ..................... 376/327 |
| 0043384 | 3/1984 | Japan ..................... 376/327 |
| 0128483 | 7/1984 | Japan ..................... 376/327 |
| 1225947 | 3/1971 | United Kingdom . |

Primary Examiner—Harvey E. Behrend
Attorney, Agent, or Firm—Antonelli, Terry & Wands

[57] ABSTRACT

In a fast breeder reactor provided with a core comprising a core region packed with a fissile material and a blanket region which surrounds the outside of said core region and most of which is formed of a fertile material, and a plurality of control rods which are put in and out of the above core region by a control rod driving device, the fast breeder reactor of the present invention is characterized in that each of said control rods is constructed of a neutron absorber region packed with a neutron absorber and a gas region disposed in the end portion on the side further separated from said control rod driving device than said neutron absorber region. With this invention, the spectral shift effect can be produced by utilizing said gas region, thereby increasing the core reactvity of the fast breeder reactor.

4 Claims, 11 Drawing Sheets

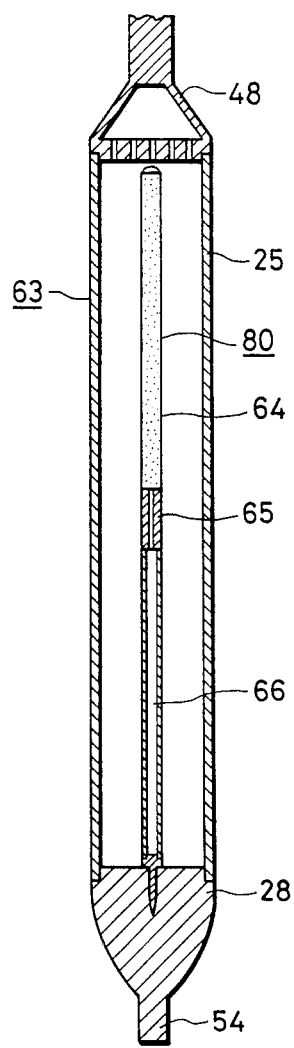
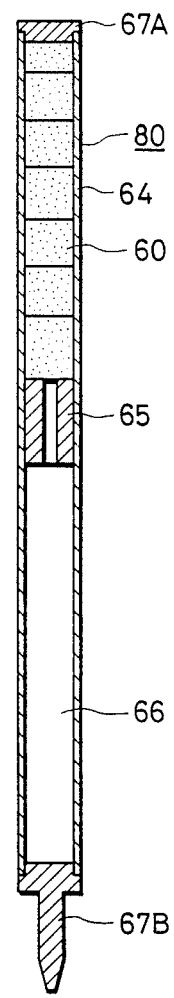

FAST BREEDER REACTOR

BACKGROUND OF THE INVENTION

A fast breeder reactor using liquid sodium as a coolant has a core comprising a core region charged with a fuel material prepared by enriching plutonium, a fissile material, and an external blanket region surrounding said core region and moreover charged with a fuel material (e.g. natural uranium or depleted uranium) whose main component is a fertile material (e.g. uranium-238). The output of the fast breeder reactor is controlled by moving control rods in and out of the core. Each control rod is provided with a plurality of neutron absorber rods packed inside with $B_4C$, a neutron absorber. The length of a region packed with the neutron absorber inside a neutron absorber rod is equal to that of the aforesaid core region. The control rods are moved vertically through control rod guide tubes installed in the core. The control rods are classified roughly into two kinds according to their functions. One is an output regulation control rod; the other is a reactor shutdown control rod. The output regulation control rod is inserted into the core region in the initial stage of operation of the fast breeder reactor to limit initial burnup reactivity. Then, it raised from the core region as burnup reactivity lowers as the operation proceed, and is raised completely out of the core region in the last stage of the operation. The output regulation control rod, however, is reinserted into the core region when the operation of the fast breeder reactor is stopped. Meanwhile, the reactor shutdown control rods are all held up outside the core region when the reactor is started, and are not inserted into the core region during the operation of the reactor. They are inserted thereinto when the operation of the reactor is stopped. In other words, the output regulation control rod regulates the output of the fast breeder reactor and stops the reactor, while the reactor shutdown control rod shuts down the reactor. The number of output regulation and reactor shutdown control rods is about equal.

The neutron absorber rod in a control rod as disclosed in the Official Gazette on Japanese Patent Laid-Open No. 65794/1975 is provided, in the upper inside, with a gas plenum which accumulates He gas produced through the absorption of neutrons by $B_4C$. This gas plenum, however, does not increase core reactivity.

SUMMARY OF THE INVENTION

An object of the present invention is to furnish a fast breeder reactor which increases core reactivity.

In a fast breeder reactor provided with a core comprising a core region packed with a fissile material and a blanket region surrounding the outside of said core region and formed mostly of a fertile material, and a plurality of control rods moved in and out of the core region by a control rod driving device, a fast breeder reactor characterized in that each of said control rods is constructed of a neutron absorber region packed with a neutron absorber, and a gas region disposed in the end portion on the side further separated from said control rod driving device than said neutron absorber region, can be obtained according to the present invention.

BRIEF DESCRIPTION OF THE DRAWINGS

FIG. 15 shows a longitudinal section of still another embodiment of the control rod employed in the present invention; FIG. 16 shows a longitudinal section of an absorber rod constituting the control rod of FIG. 15.

DESCRIPTION OF THE PREFERRED EMBODIMENT

The present inventors have conducted various investigations into how the core reactivity of a fast breeder reactor can be increased, which have resulted in the present invention. The following is a description of the content of these investigations.

Figure 11:
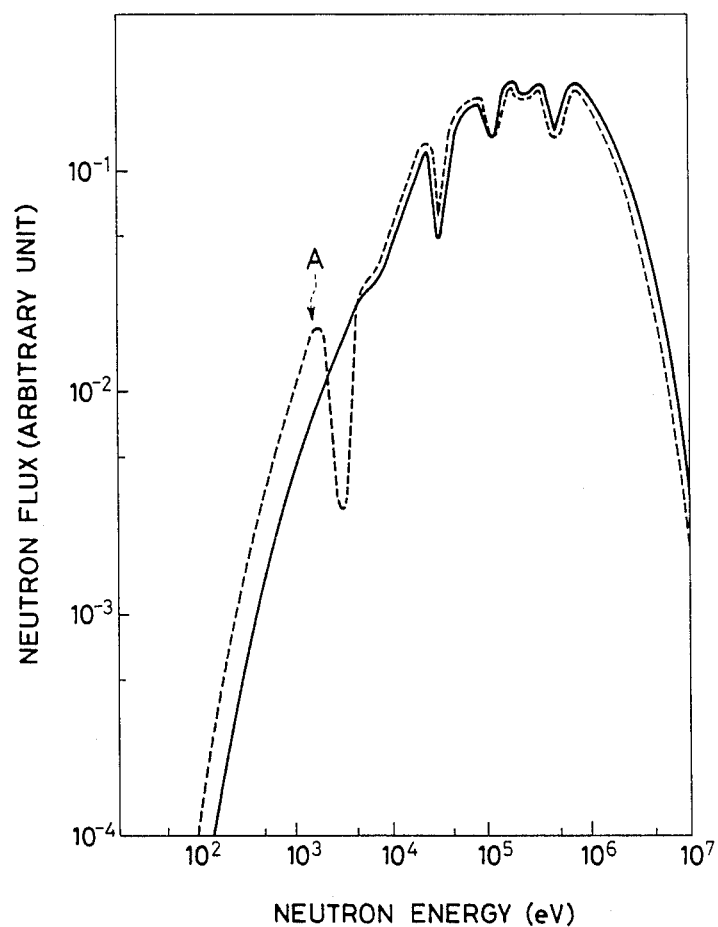
FIG. 11 is a characteristic diagram showing the relationship between neutron energy and neutron flux.

The fast breeder reactor uses liquid-metal sodium as a coolant. Sodium thus used flows, of course, through a number of fuel assemblies and control rod guide tubes provided in a core. Said sodium flows also through control rods to cool down neutron absorber rods. When the control rods are drawn out of the core region, the control rod guide tubes positioned below the control rods are filled only with sodium. As is shown in FIG. 11, sodium has a large cross-sectional area of resonant scattering in the region of 3 KeV (point A). Therefore, sodium softens neutron energy considerably. In FIG. 11, the broken line indicates the presence of sodium, and the solid line the absence thereof.

The inventors examined the effect produced when the sodium is removed from the control rod guide tubes and a gas (void) is filled up therein instead. The large cross-sectional area of resonant scattering in the vicinity of 3 KeV is eliminated by replacing sodium with the void in said guide tubes; consequently, the effect of softening a neutron energy is lost. Therefore the spectrum of the neutron energy hardens and the mean energy of neutrons is enhanced. The fission cross section of a fuel material such as $^{239}$Pu, $^{241}$Pu or $^{238}$U has a larger value as energy of the neutron is higher. Accordingly, as the energy spectrum of neutrons hardens, the rate of nuclear fission increases and the core reactivity increases. This phenomenon is called the spectral shift effect. The present invention, therefore, has attained an improvement in core characteristics by utilizing the spectral shift effect efficiently.

According to the present invention, a gas region is provided on the end of a control rod on the farside of the neutron absorber so as to utilize said spectral shift.

Figure 12:
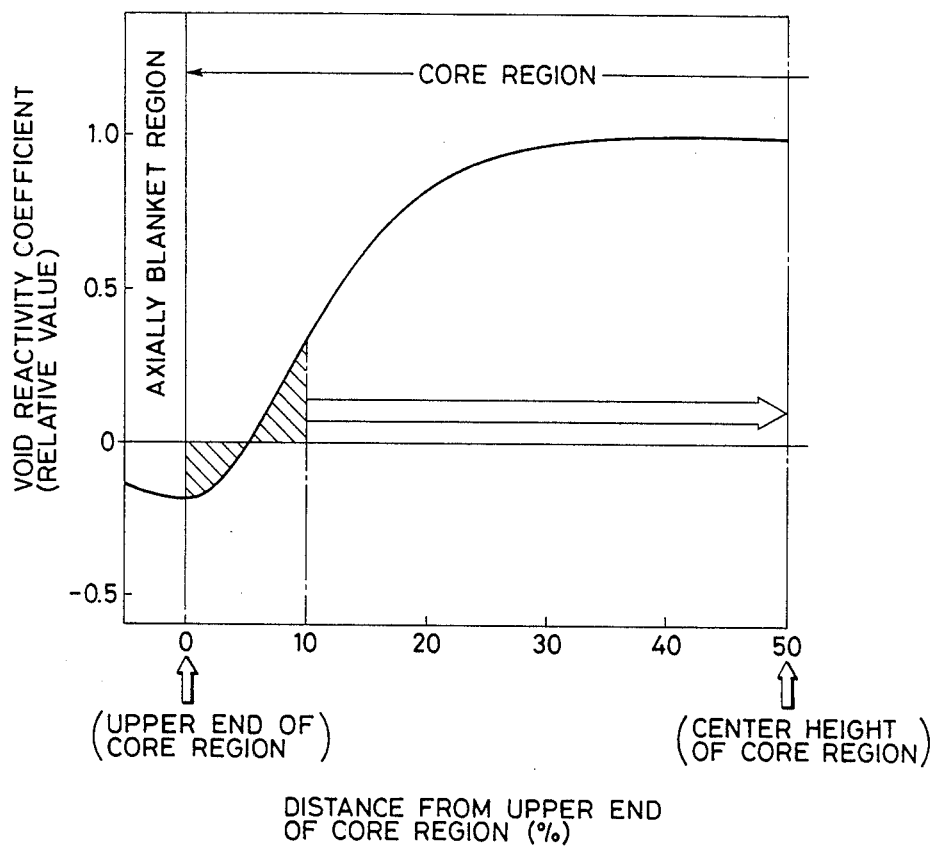
FIG. 12 is a characteristic diagram showing the distribution of the void reactivity coefficient in the axial direction of the core region.

The above is a fundamental description on the principle of the present invention. In order to attain the positive core reactivity based on the spectral shift effect, it is desirable that the length in the axial direction of the gas region located on the end of the control rod on the farside of the neutron absorber region in the present invention is set to be a prescribed value or above. In this regard a description will be made hereunder from a quantitative point of view. In FIG. 12, a void reactivity coefficient at each point in the axial direction of a core is shown in relation to the upper half of a core region from the center in the axial direction thereof. The object core is a homogeneous reactor core shown in FIG. 6, which will be described later. The height of the core region is 100 cm. The void reactivity coefficient takes a negative value in the region ranging from the upper end of the core region, which is in contact with an external blanket region, to a position at about 5% of the height of the core region toward the center in the axial direction thereof. In the core region lower than said region, however, the value of the void reactivity coefficient turns positive, and the absolute value thereof increases gradually toward the lower region, becoming maximum in the center in the axial direction of the core region. The reason why the void reactivity coefficient is negative in the vicinity of the upper end of the core region is that the effect which makes reactivity negative, caused by neutrons leaking from the core region, is relatively large in said region and this operates to cancel the contribution of the positive void reactivity coefficient which is based on the effect of the spectral shift produced by the substitution of a void for the sodium. Since the effect of the leaking neutrons is relatively smaller toward the center in the axial direction of the core region from the upper end portion thereof, the void reactivity coefficient goes positive and the absolute value thereof increases toward the center in the axial direction of the core region as shown in FIG. 12. While FIG. 12 relates to the upper half of the core region, the void reactivity coefficient in the lower half of this region shows a characteristic symmetrical with respect to the upper half thereof in relation to a plane vertical to the axis of the region by the same reason.

Now, consideration will be given to the case where the length of the gas region of a control rod is increased gradually toward the lower end of the core region from a position where the fore end of the neutron absorber region of the control rod is on the boundary between the external blanket region and the core region (that is, the neutron absorber region is withdrawn entirely from the core region). The effect on reactivity of charging the gas region in this case is that the reactivity is negative when the length in the axial direction of the gas region is 5% or less of the height of the core region, zero when said length is 10% of said height, and positive when the former is larger than 10% of the latter, as is seen from FIG. 12. Accordingly, the length in the axial direction of the gas region needs to be larger than 10% of the height of the core region in consideration of the state in which the neutron absorber region of the control rod is withdrawn entirely from the core region (in other words, the end of the neutron absorber region on the fore end side of the control rod is positioned on the boundary between the external blanket region and the core region). By making the length in the axial direction of the gas region of the control rod larger than 10% of the height of the core region, the spectral shift effect can be efficiently utilized.

The following is a detailed description of an embodiment of the present invention which is designed on the basis of the above-stated examinations.

Figure 4:
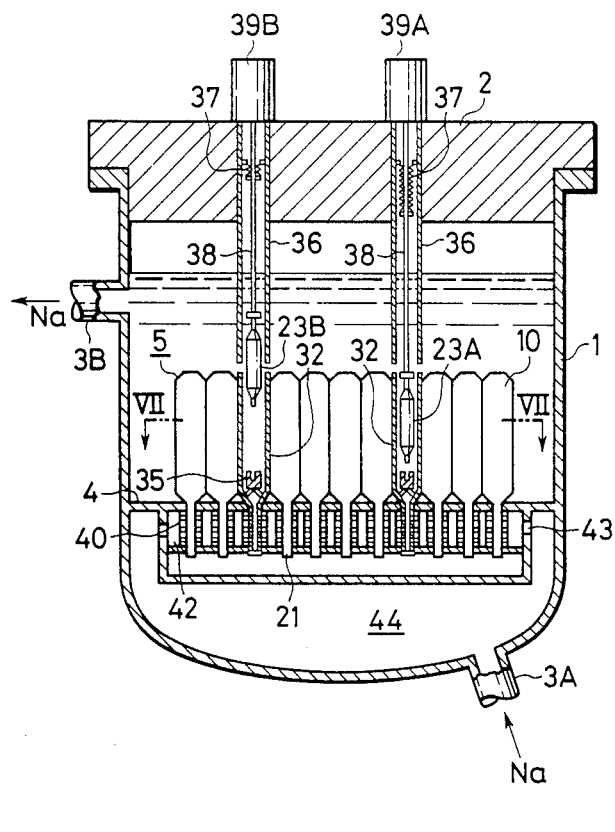
FIG. 4 shows a longitudinal section of the fast breeder reactor which is one preferred embodiment of the present invention.
Figure 5:
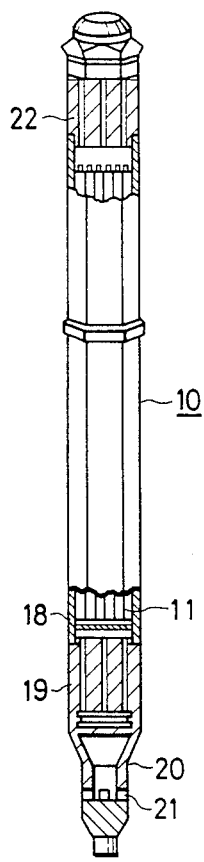
FIG. 5 is a partially-sectional structural view of a fuel assembly charged in a core of the fast breeder reactor shown in FIG. 4.

The fast breeder reactor of the present embodiment, as shown in FIG. 4 has a reactor vessel 1 blocked up in the upper end by a rotary plug, a core support board 4 provided in the reactor vessel 1, a core 5 constituted by a number of fuel assemblies 10, and control rods inserted into the core 5. The fuel assemblies 10 are retained in such a manner that entrance nozzles 20 in the lower ends thereof are inserted into flow regulation tubes 40 fitted to the core support board 4. The structure of each fuel assembly 10 is shown in FIG. 5. The fuel assembly 10 is constructed in such a way that the opposite ends of a flared tube 18 are fitted to a lower shield 19 and an upper shield 22 respectively and a number of fuel pins 11 disposed in the flared tube 18 are fitted to the lower shield 19. The entrance nozzle 20 having openings 21 through which a coolant sodium flows in is provided in the lower part of the lower shield 19.

The coolant sodium cooled down by an intermediate heat exchanger (not shown in the figures) flows into a lower plenum 44 in the reactor vessel 1 through an inlet nozzle 3A. Thereafter the sodium flows into a highpressure plenum 42 through openings 43 and further is introduced into the fuel assemblies 10 through openings provided in the flow regulation tubes 40 and the openings 21. The sodium is then heated by the fuel pins 11 in the fuel assemblies 10 and thereby the temperature thereof is raised. The high temperature sodium flows outside the reactor vessel 1 through an outlet nozzle 3B and is sent to the aforesaid intermediate heat exchanger.

Figure 6:
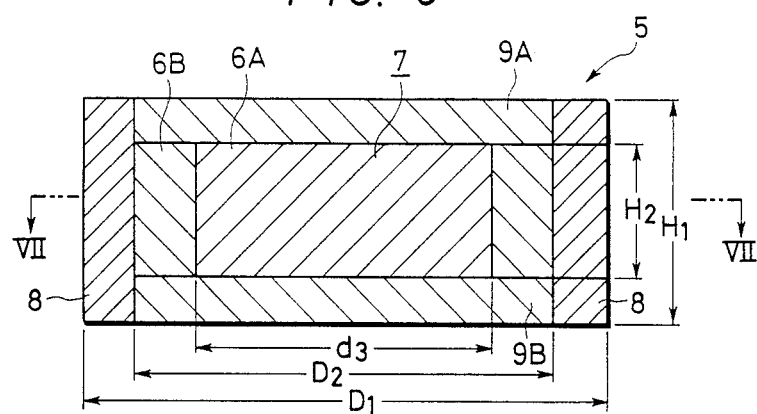
FIG. 6 is a schematic longitudinal sectional view of the core of the fast breeder reactor of FIG. 4.

FIG. 6 shows a schematic longitudinal sectional structure of the core 5 constituted by a number of fuel assemblies 10. The description of the control rod is omitted in this figure. The core 5 has a core region 7 and an external blanket region surrounding the core region. The core region 7 consists of an inside core region 6A and an outside core region 6B surrounding the circumference of the inside core region 6A in the radius direction thereof. The inside and outside core regions 6A and 6B are formed of plutonium 239, a fissile material, which has been enriched. The degree of enrichment of plutonium 239 is higher in the outside core region 6B than in the inside core region 6A for leveling an output in the radius direction of the core region 7. The external blanket region consists of axial-direction blanket regions 9A and 9B disposed in contact with the upper and lower ends of the inside and outside core regions 6A and 6B respectively, and a radius-direction blanket region 8 surrounding the peripheries of the outside core region 6B and the axial-direction blanket regions 9A and 9B (in the radius direction). The radius-direction blanket region 8 and the axial-direction blanket regions 9A and 9B are charged with a fuel material (e.g. natural uranium or depleted uranium) whose main constituent is uranium 238, a fertile material.

The core 5 is a homogeneous reactor core. In FIG. 6, $H_1=170$ cm, $H_2=100$ cm, $D_1=405$ cm, $D_2=325$ cm, and $d_1=243$ cm.

Figure 7:
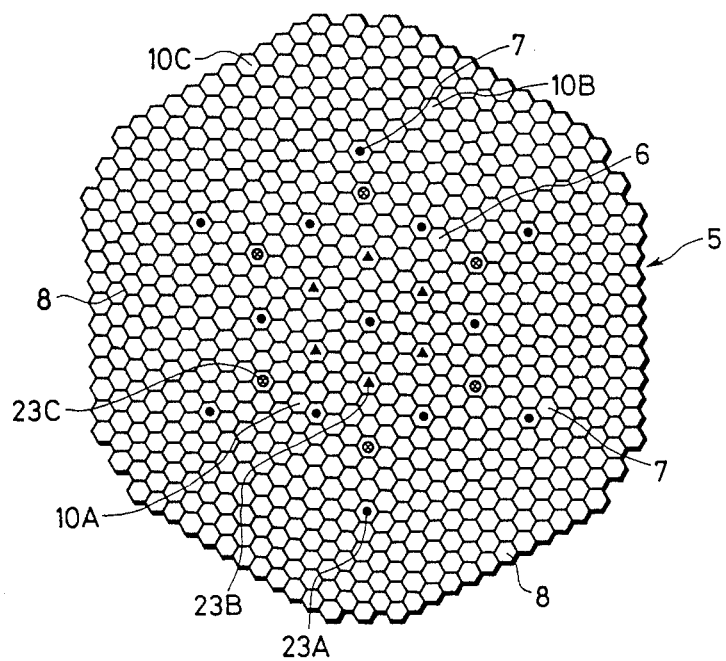
FIG. 7 shows a section taken along lines VII—VII of FIGS. 4 and 6.

As is shown in FIG. 7, the core 5 comprises fuel assemblies 10A containing the inside core region 6A and the axial direction blanket regions 9A and 9B and forming a I layer in the central part, fuel assemblies 10B containing the outside core region 6B and the axial-direction blanket regions 9A and 9B and forming a II layer surrounding the outer periphery of the I layer, and fuel assemblies 10C containing the radius-direction blanket region 8 and forming a III layer surrounding the outer periphery of the II layer.

Figure 8A:
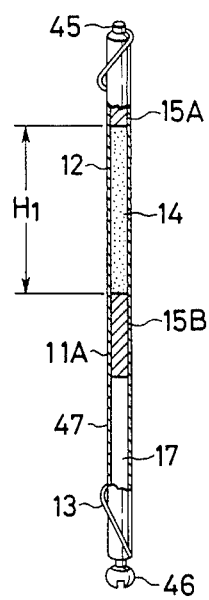
FIGS. 8 (A) and 8 (B) show longitudinal sections of fuel pins charged in the fuel assembly of FIG. 5.

The structures of the fuel assemblies charged in the I, II and III layers will be described hereunder on the basis of FIGS. 8A and 8B. The fuel assemblies 10A charged in the I layer use a fuel pin 11A shown in FIG. 8A as the fuel pin 11 in the fuel assembly 10 shown in FIG. 5. The fuel pin 11 is prepared by packing two kinds of fuel pellets, i.e. core fuel pellets and blanket fuel pellets, in a sheath tube 47 sealed up at both ends with end plugs 45 and 46. Inside the sheath tube 47, an upper blanket region 15A, a core region 14 and a lower blanket region 15B are disposed in this sequence from above, that is, from the side of the end plug 45. Under the lower blanket region 15B, there is a gas plenum 17 for accumulating a gas produced by fission. The upper and lower blanket regions 15A and 15B are packed with the blanket fuel pellets formed of natural uranium which contains a large amount of uranium-238. The core region 14 is packed with the core fuel pellets formed of $PuO_3$-$UO_2$ which is prepared by enriching plutonium-239. The length from the upper end of the upper blanket region 15A to the lower end of the lower blanket region 15B is 175 cm ($H_1$). A wire spacer 13 is fitted on the outer periphery of the sheath tube 47.

The fuel assemblies 10B in the II layer are provided with the same fuel pins with the fuel pins 11A in their structure, though the degree of enrichment of plutonium 239 in the core region 14 is higher than the above.

Figure 8B:
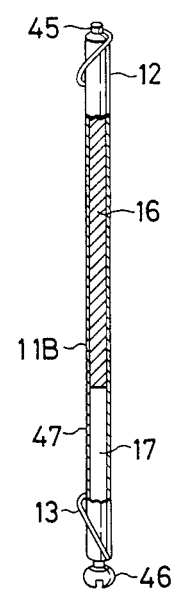

For the fuel assemblies 10C charged in the III layer, a fuel pin 11B of FIG. 8B is used. The fuel pin 11B has a blanket region 16 packed only with the blanket fuel pellets and positioned above the gas plenum 17 in the sheath tube 47.

Control rods are divided into three kinds: an output regulation control rod 23A, a reactor shutdown control rod 23B and a back-up safety rod 23C, as shown in FIG. 7. The total number of the reactor shutdown control rods 23B and the backup safety rods 23C equals the number of the output regulation control rods 23A. In any of the aforesaid control rods $B_4C$ is used as a neutron absorber. The output regulation control rods 23A control the output of the fast breeder reactor during its operation to compensate for the reduced output of the reactor with fuel consumption and for certain other purposes. These control rods 23A are raised gradually from the core region 7 during the operation of the fast breeder reactor. The reactor shutdown control rods 23B are employed to shut down the reactor. The control rods 23B are raised entirely from the core region 7 when the fast breeder reactor starts to operate, and are held in this state during the normal operation of the reactor. The reactor shutdown control rods 23B are inserted entirely into the core region 7 to shutdown the reactor for maintenance, inspection, replacement of fuel, or scram in an emergency. The output regulation control rods 23A are also inserted entirely into the core region 7, of course, when the fast breeder reactor is shut down. The back-up safety rods 23C have the same function as the reactor shutdown control rods 23B. The back-up safety rods 23B have a different driving mechanism from that of the reactor shutdown control rods 23B and back up the latter. Specifically, the backup safety rods 23C are inserted into the core region 7 instead of the reactor shutdown control rods 23B to stop the fast breeder reactor when it is impossible to insert the control rods 23B into the core region 7. The reactor shutdown control rods 23B and the back-up safety rods 23C are control rods employed to shutdown the reactor, while the output regulation control rods 23A are control rods employed mainly to regulate the output of the reactor, although they have also the function of shutting down the reactor.

Figure 1:
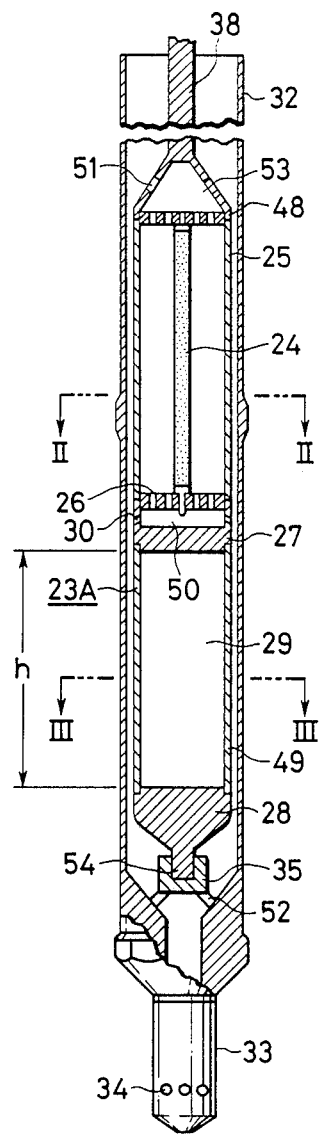
FIG. 1 shows a longitudinal section of an output regulation control rod employed for a fast breeder reactor which is one preferred embodiment of the present invention.
Figure 2:
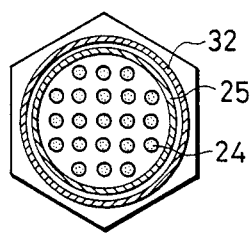
FIG. 2 shows a section taken along a line II—II of FIG. 1.
Figure 3:
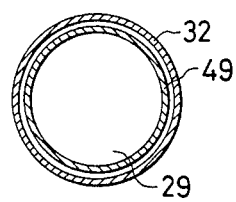
FIG. 3 shows a section taken along a line III—III of FIG. 1.

The structure of the output regulation control rod 23A will be described hereunder on the basis of FIGS. 1 to 3. The structures of the reactor shutdown control rod 23B and the back-up safety rod 23C are the same as that of the control rod 23A. The output regulation control rod 23A is provided with a plurality of absorber rods 24, an upper tie plate 48, a lower tie plate 26, and an upper neutron shield 27, constructed of SUS, for instance, a lower neutron shield 28 and a cylindrical sleeve 49 which form a hollow part 29, a gas region, inside of them. The absorber rod 24 is constituted of a sheath tube sealed up at both ends and packed with $B_4C$ pellets. A gas plenum accumulating a fission gas is formed in the upper end region, above a neutron absorber region, inside the absorber rod 24. The height in the axial direction of the neutron absorber region packed with $B_4C$ pellets equals the height $H_2$ of the core region 7. The concentration of boron 10 in the neutron absorber region is uniform in the axial direction and equal to that of a conventional control rod. The opposite ends of the absorber rod 24 are held by the upper tie plate 48 and the lower tie plate 26 respectively. The upper and lower tie plates 48 and 26 are coupled to each other by a cylindrical cover 25. Each absorber rod 24 is disposed inside the cylindrical cover 25. The upper tie plate 48 has a connecting member, not shown in the figures, in the upper end region thereof. Moreover, the upper neutron shield 27 is fitted to the lower tie plate 26, while the lower neutron shield 28 is fitted to the upper neutron shield 27 through the intermediary of the cylindrical sleeve 49. The hollow part 29 is formed by the upper and lower neutron shields 27 and 28 and the cylindrical sleeve 49 which surround same. In the present embodiment, the height h in the axial direction of the hollow part 29 formed nearer to the fore end side of the control rod than the neutron absorber region equals to the height $H_1$ of the core region 7. The lower neutron shield 28 is provided, in the lower end portion, with a dashram 54 constituting a shock absorber.

A plurality of cylindrical lower guide tubes 32 are arranged among the fuel assemblies 10 inside the core 5. The lower structure of the lower guide tube 32 will be described with reference to FIG. 1. An entrance nozzle 33 provided in the lower end portion of the lower guide tube 32 is inserted into a flow regulation tube 40 to be supported by the core support board 4. A shock absorber 35 having a dashpot is disposed in the lower end portion inside the lower guide tube 32 and fixed to this tube by a support member 52. An upper guide tube 36 is disposed, as shown in FIG. 4, on an extension of and above the lower guide tube 32. The upper guide tube 36 is fixed to the rotary plug 2.

The output regulation control rod 23A moves through the lower guide tube 32 and the upper guide tube 36. Control rod driving devices 39A and 39B are installed on the rotary plug 2. A driving extension shaft 38 extending downward from the control rod driving device 39A is detachably connected to the connecting member of the output regulation control rod 23A through the upper guide tube 36. The opposite ends of a cylindrical bellows 37 are fitted to the upper guide tube 36 and the driving extension shaft 38 respectively. The cylindrical bellows 37 checks the upward transfer of sodium vapor rising through the upper guide tube 36.

The reactor shutdown control rod 23B and the back-up safety rod 24C also move through the lower guide tube 32 and the upper guide tube 36 respectively. The reactor shutdown control rod 23B is detachably connected to the driving extension shaft 38 extending downward from the control rod driving device 39B. The control rod driving devices 39A and 39B raise and lower the driving extension rods 38 with the motors, which are not shown in the figures. The control rod driving device 39A is driven not only when the fast breeder reactor is started up and shut down, but also when the output of the reactor is regulated during its operation. The control rod driving device 39B is driven when the reactor is started and shut down, but not driven when the output thereof is regulated during its operation. The backup safety rod 23C is driven up and down by a mechanism different from the control rod driving device 39B, e.g. fluid pressure.

Sodium under high-pressure in the plenum 42 passes through openings provided in the flow regulation tube 40 and the openings of the lower guide tube 32 and flows into the entrance nozzle 33. This sodium passes between the support members 52 and rises through the lower guide tube 32. The sodium passes through openings 30 and reaches the internal space 53 of the upper tie plate 48 through an internal space 50 between the lower tie plate 26 and the upper neutron shield 27 and through flow passages among the absorber rods 24, and then flows outside the output regulation control rod 23A through openings 51. The absorber rods 24 are cooled by the sodium.

Figure 9A:
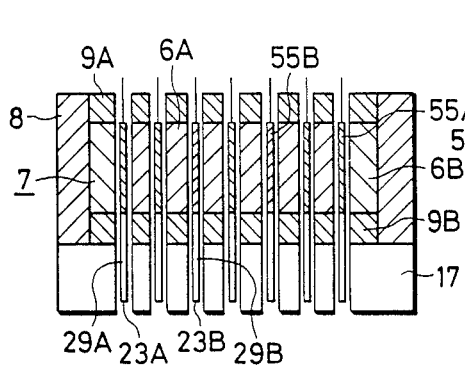
FIGS. 9 (A), (B), (C) and (D) show the states of operation of control rods in the present embodiment, of which (A) illustrates the state of the control rods at reactor shutdown, (B) in the initial stage of the operation thereof, (C) in the middle stage of the operation thereof, and (D) in the last stage of the operation thereof.

A description will be made hereunder on the operation of the fast breeder reactor based on the operation of the control rods in the present embodiment. FIG. 9(A) shows the state in which the neutron absorber region 55A of the output regulation control rod 23A and the neutron absorber region 55B of the reactor shutdown control rod 23B are inserted entirely into the core region 7 and thereby the operation of the fast breeder reactor is stopped. The neutron absorber regions 55A and 55B are regions packed with $B_4C$ pellets in the respective control rods 23A and 23B. The hollow part 29A of the output regulation control rod 23A and the hollow part 29B of the reactor shutdown control rod 23B are inserted into the axial-direction blanket region 29B and the gas plenum 17 under the core region 7. Although not shown in the figure, the back-up safety rod 23C is inserted into the core 5 as is likewise the reactor shutdown control rod 23B.

Figure 9B:
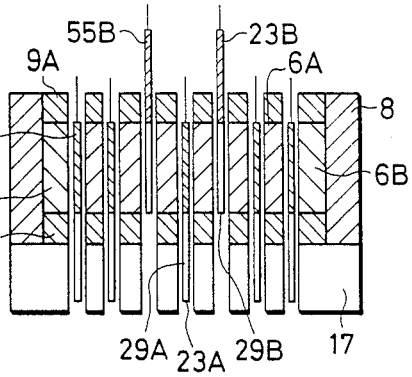

FIG. 9(B) shows the state of the initial stage of operation in which the fast breeder reactor is started. The neutron absorber region 55B of the reactor shutdown control rod 23B is raised entirely up above the core region 7 by the driving of the control rod driving device 39B. The whole of the hollow part 29B of the control rod 23B is positioned inside the core region 7. The backup safety rod 23C is in the same state as the control rod 23B, although not shown in the figure. The output regulation control rod 23A is in the same state as in FIG. 9(A). In the initial stage of operation of the fast breeder reactor, the hollow part 29B of the reactor shutdown control rod 23B and the hollow part of the backup safety rod 23C are present in the lower guide tubes 32 inside a part of the core region 7. There is no neutron absorber in these hollow parts; rather, a gas such as air or helium is therein. Therefore, sodium is mostly excluded and a gas region is formed in the part of the lower guide tubes 32 for the reactor shutdown control rod 23B and the back-up safety rod 23C, which is positioned in the core region 7. When the gas region exists in the core region 7, the neutron energy spectrum turns hard, i.e., a mean neutron energy becomes high, as described previously, so that core reactivity is increased. In addition, since neutron energy is high, the number of high-speed neutrons reaching the axial-direction blanket regions 9A and 9B increases, so that the ratio of conversion of uranium 238 in the axial-direction blanket regions 9A and 9B into plutonium 239 is raised. That is, a breeding factor is raised.

Figure 9C:
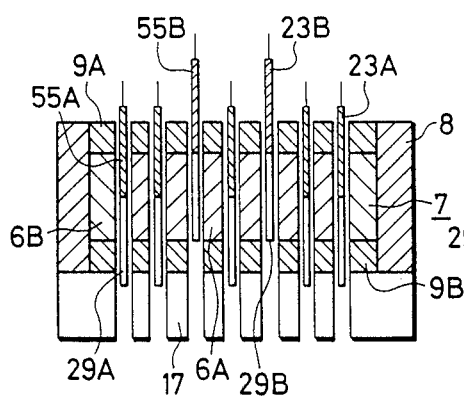
Figure 9D:
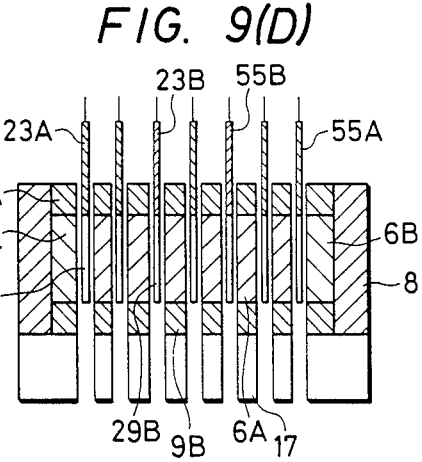

The output of the fast breeder reactor lessens as the operation proceeds. In order to compensate for this lowering of the output of the reactor, the neutron absorber region 55A of the output regulation control rod 23A is gradually raised from the core region 7. With the withdrawal of the neutron absorber region 55A from the core region 7, the hollow part 29A is transferred upward into the core region 7. FIG. 9(C) shows the state of the middle stage of operation of the reactor in which the neutron absorber region 55A of the output regulation control rod 23A is withdrawn by half from the core region 7. In addition to positive reactivity charged by the withdrawal of the neutron absorber region 55A from the core region 7 with the raising of the output regulation control rod 23A, positive reactivity is also charged afresh by the exclusion of sodium from the lower guide tube 32. The latter reactivity is newly generated in the present embodiment. Specifically, the hollow part 29A barely absorbing neutrons comes into the part wherefrom the neutron absorber region 55A is withdrawn in the present embodiment, while sodium which absorbs neutrons enters this part in a conventional reactor, so that said latter reactivity is charged afresh. Therefore, with the hollow part 29A provided, the output regulation control rod 23A is capable of charging the same positive reactivity as in a conventional control rod with less withdrawal than the conventional one. By withdrawing the neutron absorber region 55A of the output regulation control rod 23A from the core region 7, in the present embodiment, the neutron energy spectrum in the lower part of the core region 7 is harder on the average than in the state of FIG. 9 (B) in which the hollow parts of the reactor shutdown control rod 23B and the backup safety rod 23C are inserted into the core region 7; therefore, the ratio of conversion into plutonium 239 in the axial-direction blanket region 9B is increased.

When the operation of the fast breeder reactor reaches its final stage with the passage of operating time from the state of FIG. 9 (C), the neutron absorber region 55A of the output regulation control rod 23A is raised entirely from the core region 7, and the whole of the hollow part 29A is inserted into the core region 7 as shown in FIG. (D). Therefore, the neutron energy spectrum in the upper portion of the core region 7 also is harder than in the states of FIGS. (B) and (C). Accordingly, the ratio of conversion into plutonium 239 in the axial-direction blanket region 9A is further increased.

When the operation of the fast breeder reactor is shut down, the neutron absorber regions of all the control rods are inserted into the core region 7 from the state of FIG. 9 (D).

Figure 10:
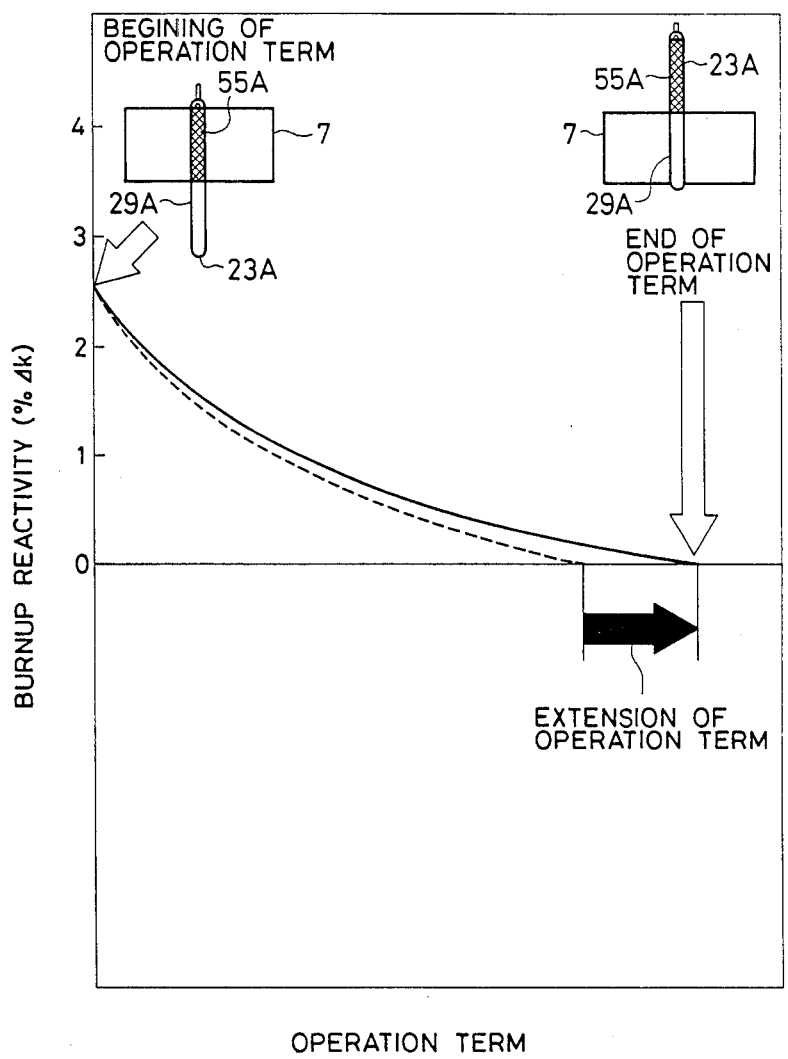
FIG. 10 is a characteristic diagram showing the degree of the extension of an operation term in the reactor of FIG. 4 in which the control rod of FIG. 1 is used.

Since the hollow part 29A of the output regulation control rod 23A is inserted into the core region 7 simultaneously with the withdrawal of the neutron absorber region 55A thereof from said region 7 in the present embodiment, the duration of the operation term of the fast breeder reactor can be extended by 10% as shown by a solid line of FIG. 10, which indicates the present embodiment, compared with that of a conventional one indicated by a broken line in the same figure. This extension can be attained, because the reduction of burnup reactivity is slowed by the effective utilization of neutrons which are absorbed by sodium in the conventional reactor, i.e. an improvement in neutron economy, and by a reactivity gain obtained by the previously-described spectral shift. The reactivity gain is 0.2% $\Delta k$ in the final stage of operation (FIG. 9 (D)) in which the hollow parts 29A of all the output regulation control rods 23A are inserted completely into the core region 7, and thus the duration of the operation term is extended by 10% as described above. In this way, the operation can be prolonged by about one month in an ordinary one-year-cycle operation (ten-month operation and two-month regular inspection).

The hollow parts of the reactor shutdown control rod 23B and the backup safety rod 23C are inserted entirely into the core region 7 from the initial stage of operation onward as described above. Consequently, the effect of the spectral shift produced by the insertion of these hollow parts enables the attainment of a reactivity gain of 0.2% $\Delta k$ approx., compared with the case of a conventional fast breeder reactor, and thereby the amount of charged fuel (plutonium) can be reduced. In addition, such effects can be produced as improved neutron economy, increased plutonium conversion ratio, reduced output mismatch and uniform output distribution.

The aforesaid effects of the improvement in neutron economy, the increase in the plutonium conversion ratio and the leveling of the output distribution can be attained also by the control rod 23A. These effects are enhanced as the hollow part 29A is inserted into the core region 7 as the operation proceeds and reach the maximum in the final stage thereof.

One of the great effects of the present embodiment is an improvement in safety. First, the replacement of the sodium in the core region 7 by the hollow part 29 reduces the positive void reactivity coefficient by 8% to 15%. Therefore, even when an abnormal transient phenomenon occurs, increased output or fuel temperature can be held to a minimum. When vibrations are caused by an earthquake or the like in the state in which conventional control rods formed of neutron absorbers are inserted in the core region, the reactivity is varied by the vertical movement of the control rods so that the core output or the fuel temperature is made unstable. In the state in which the hollow parts 29 of the control rods are inserted in the core region 7 as in the present embodiment, in contrast, the variation in reactivity accompanying such vibrations is virtually nil, so that the core functions stably. Moreover, when a scram is necessary, the hollow parts 29 whereby positive reactivity has been charged theretofore are withdrawn from the core region 7, said withdrawal being equivalent to charging negative reactivity, and thereafter negative reactivity is charged by the insertion of the neutron absorber regions, so that the control rods are more effective in the core of this reactor are those in the conventional reactor. In other words, the reactivity value of the control rods is increased. The above-stated effects can be obtained even when either the output regulation control rod or the reactor shutdown control rod is constructed in the same way as the control rod shown in FIG. 1, although said effects are inferior in this case to those obtained when both of said control rods are constructed in this way.

The lengths of the neutron absorber region and the hollow part 29 of the present embodiment are equal to the height $H_2$ of the core region 7.

In the present embodiment, the upper and lower neutron shields formed of SUS are provided above and below the hollow part 29. When the hollow part 29 is inserted entirely in the core region 7, the lower surface of the upper neutron shield 27 is positioned on the boundary between the axial-direction blanket region 9A and the core region 7, while the upper surface of the lower neutron shield 28 is positioned on the boundary between the axial-direction blanket region 9B and the core region 7. Since these neutron shields have the function of a reflector, neutrons going toward the outside of the core region 7 are reflected to the inside thereof when the hollow part 29 is inserted entirely in this region 7. Therefore the effect of a positive void reactivity in the core region is further increased.

As one of variants of the present embodiment, sodium inlet ports, which are normally closed, can be provided in the hollow part 29 so that they can be opened in emergency to let sodium flow into the hollow part 29 to lower core reactivity and thereby to further ensure the safety of the core.

Figure 13:
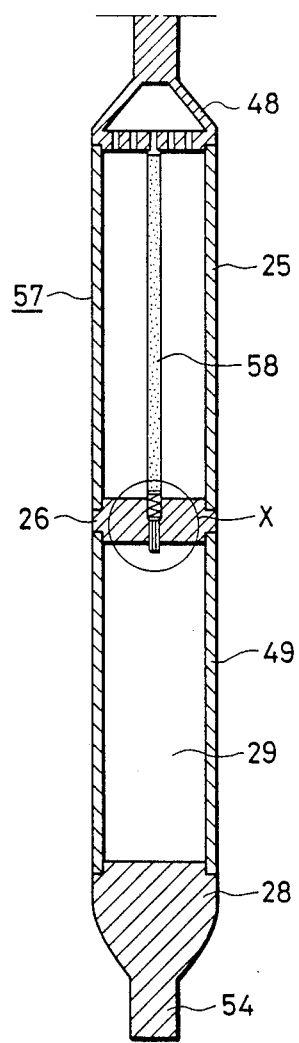
FIG. 13 shows a longitudinal section of another embodiment of the control rod employed in the present invention.
Figure 14:
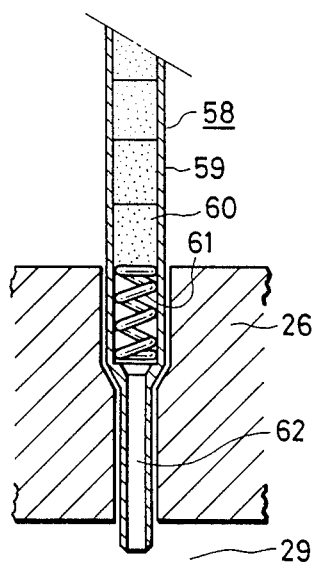
FIG. 14 is an enlarged view of a portion X of FIG. 13.

A control rod, which is another embodiment of the output regulation control rod 23A, the reactor shutdown control rod 23B and the back-up safety rod 23C employed for the fast breeder reactor of FIG. 4, will be described hereunder on the basis of FIGS. 13 and 14. The same components as of the above-described embodiment are denoted by the same numerals and marks.

A control rod 57 of the present embodiment has a plurality of absorber rods 58 provided inside a cylindrical cover 58 fitted to the upper tie plate 48 and the lower tie plate 26, and a hollow part which is located below said absorber rods and in which air (or He) is hermetically sealed. The hollow part 29 is formed by the lower tie plate 26 functioning as the upper neutron shield 27, the lower neutron shield 28 and the cylindrical sleeve 49 which surround this part.

The absorber rod 58 is constructed by packing $B_4C$ pellets 60, neutron absorbers, in a sheath tube 59 sealed up in the upper end and by disposing a coil spring 61 in the lower end portion inside the sheath tube 59. The sheath tube 59 is provided with an opening 62 in the lower end portion. The absorber rod 58 is supported, at the upper and lower end portions, by the upper tie plate 48 and the lower tie plate 26. The present embodiment differs from the embodiment of FIG. 1 in that the neutron absorber region (a region packed with the $B_4C$ pellets) of the absorber rod 58 is connected to the hollow part 29 through the intermediary of the coil spring 61 and the opening 62. The present embodiment is characterized in that the hollow part 29 positioned in the lower portion can be utilized as a reservoir for fission gas produced in the absorber rod 58 according to the above-described construction. For instance, $B_4C$ generates He gas through the (N, α) reaction under the neutron irradiation, thereby the internal pressure of the absorber rod 58 is raised, and this works as one of factors determining the lifetime of the control rod. According to the present embodiment, however, the He gas thus generated is diffused into a broad region of the hollow part 29 positioned below; therefore, the lifetime of the control rod can be prolonged. The fission characteristics obtained by employing the present embodiment are identical with those obtained by the previously-described embodiment 1. Accordingly, the employment of the control rod of the present embodiment enables the attainment of the same effects as obtained by the previously-described embodiment with respect to the improvements in the operational performance of a fast reactor, fuel economy and safety, including the 10-percent increase of the duration of the operation term, the reduction in the amount of charged fuel, the improvement in neutron economy, the increase in the plutonium conversion ratio, the curtailment of doubling time, the leveling of the output distribution, the reduction of the void reactivity coefficient, the reduction in the variation of the reactivity due to the vibrations of the control rods, and the increase in the effectiveness of the control rods. Therefore, the present embodiment provides another advantage of the aforesaid prolongation of the lifetime of the control rods, in addition to the above-stated effects.

FIGS. 15 and 16 show another embodiment of the control rod 57. In a control rod 63 of the present embodiment, the opposite end portions of an absorber rod 80 are held by the upper tie plate 48 and the lower neutron shield 28 connected together by a cylindrical cover 25. The lower neutron shield 28 functions also as the lower tie plate 26. The absorber rod 80 has a neutron shield 65 provided in the central portion inside a sheath tube 64 which is sealed up at the opposite ends with end plugs 67A and 67B. A through hole is provided in the center of the neutron shield (SUS) 65. $B_4C$ pellets 60 are packed inside the sheath tube 64 above the neutron shield 65, while a hollow part 66 is formed inside said sheath tube 64 below said shield 65. The height of a neutron absorber region packed with the $B_4C$ pellets 60 and that of the hollow part 66 are equal to the height of the core region 7. The neutron absorber region in the sheath tube 64 is connected to the hollow part 66 via the through hole of the neutron shield 65. An additional effect of the present embodiment is to prolong the lifetime of the control rod by utilizing the hollow part 66 as a gas reservoir in the same way as the control rod 57. The other effects of the present embodiment are the same as those of the embodiment of FIG. 4.

Another embodiment of the present invention will be described hereunder on the basis of FIG. 17. A fast breeder reactor of the present embodiment is provided with control rods 68 each of which has three regions: a first neutron absorber region 69, a second neutron absorber region 70 and a hollow part 29. These regions are disposed from above downward in the sequence of the above description. The concentration of boron 10 in the $B_4C$ pellets in the first neutron absorber region 69 is higher than that in the second neutron absorber region 70. The heights of the second neutron absorber region 70 and the hollow part 29 are equal to the height of the core region 7, while the height of the first neutron absorber region 69 is smaller than that of the core region 7.

Figure 17A:
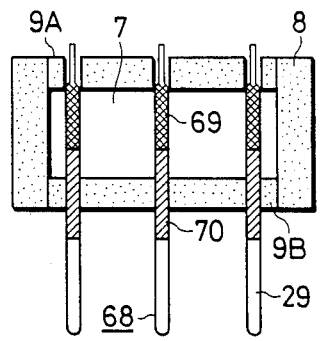
FIGS. 17 (A), (B) and (C) show the states of operation of control rods in a fast breeder reactor which is another embodiment of the present invention, of which (A) illustrates the state of the control rods at reactor shutdown, (B) in the initial stage of the operation thereof, and (C) in the last stage of the operation thereof.
Figure 17B:
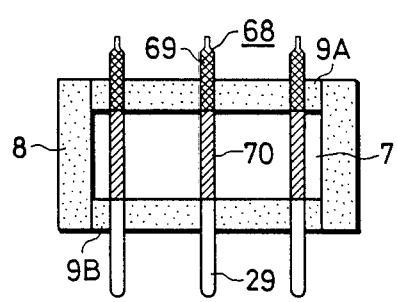
Figure 17C:
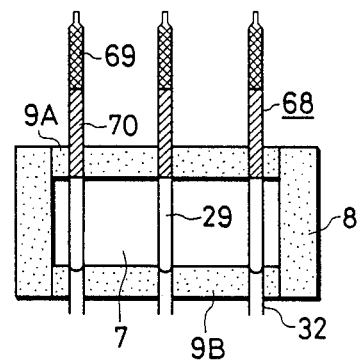

FIG. 17 (A) shows the state in which the operation of the fast breeder reactor is stopped. The first neutron absorber regions 69 of all the control rods 68 are inserted entirely in the core region 7. The hollow parts 29 are inserted in a gas plenum 17 located below an axial-direction blanket region 9B, although not shown in the figure. After the fast breeder reactor has been started, the control rods 68 are gradually raised, and, in the initial stage of operation, the first neutron absorber regions 69 of all the control rods 68 are withdrawn entirely from the core region 7, while the second neutron absorber regions 70 are inserted entirely into said region 7. In this state (FIG. 17 (B)) an output operation is conducted. In the final stage of operation, the hollow parts 29 of all the control rods 68 are inserted completely in the core region (FIG. 17 (C)), and in this state, the operation of the fast breeder reactor is ended. The present embodiment differs from the embodiment of FIG. 4 in that the hollow parts 29 of all the control rods 68 are inserted simultaneously into the core region 7 in the operation and thereby the effect of the spectral shift can be doubled. According to the present embodiment, the reactivity added in the ending stage of operation by the insertion of the hollow parts 29 is about 0.2% Δk, and thus the duration of the operation term can be extended by about 20%. This means that the duration of the operation term is extended by about two months in a one-year-cycle operation, thereby improving fuel economy.

The effect of reducing the amount of charged fuel out of a number of effects described regarding the embodiment of FIG. 4 can not be expected from the present embodiment, since the hollow parts 29 of all the control rods 68 are employed for the spectral shift. In the embodiment of FIG. 4, void tubes attached to half of the reactor shutdown control rods 23B are inserted in the initial stage to enhance reactivity, thereby reducing the amount of charged fuel. However, the other effects relating to the improvements in fuel economy and safety, i.e. the improvement in the neutron economy, the increase in the plutonium conversion ratio, the leveling of the output distribution, the reduction of the void reactivity coefficient, the reduction in the variation of the reactivity due to the vibrations of the control rods, etc., can be attained likewise, and these effects are increased with the operation.

The construction of the first and second neutron absorber regions 69 and 70 should be determined so that the above-described operation may be performed, and the rate of content of a neutron absorber in each region and the length of each region may be determined as follows: the length of the first neutron absorber region 69 and the rate of content of the neutron absorber therein are determined so that the burnup reactivity of the core region 7 can be suppressed in the state in which all the control rods 68 are inserted partially and the hollow parts 29 are left below the core region 7 in the initial stage of operation (FIG. 17 (B)); and the length of the second neutron absorber region 70 and the rate of content of the neutron absorber therein are determined so that sufficient control capacity can be held in the state in which all the control rods 68 are inserted entirely while the reactor is shut down (FIG. 17 (A)).

Moreover, the above-stated conditions can be met by varying the materials of the neutron absorbers in the first and second neutron absorber regions.

While FIGS. 17 (A), (B) and (C) show the embodiment in which the neutron absorber region of the control rod is divided into two regions, the same effects as described above can be attained by dividing said region into three or more regions.

With the present invention, core reactivity can be remarkably increased, since the invention enables the effective utilization of fast neutrons of high energy which are generated by nuclear fission.

We claim:

1. A fast breeder reactor comprising: a core having a core region encompassed by a blanket region; at least one hollow guide tube disposed inside said core and permitting the passage of a coolant therethrough; control rod means including a hollow cover member and a hollow elongated sleeve connected in series with said cover member at a lower part thereof, said control rod means adapted to be inserted into said guide tube for vertical movement therein; control rod driving means for vertically moving said control rod means via said cover member; said control rod means including a plurality of absorber rods each encased in said cover member, a neutron absorber encased in each of said absorber rods, said hollow sleeve filled with a gas and hermetically sealed with respect to said coolant, the interior of said hollow elongated sleeve having a vertical length of 10% to 100% of the vertical length of said core region and having a total volume greater than the total volume of neutron absorber encased in said plurality of absorber rods, the interior of said hollow elongated sleeve being void of coolant and solid material, said hollow elongated sleeve enabling an increase of core resistivity of said fast breeder reactor when positioned within said core region.

2. A fast breeder reactor according to claim 1, wherein the interior of said absorber rod communicates with the interior of said hollow elongated sleeve through an opening.

3. A fast breeder reactor comprising: a core having a core region encompassed by a blanket region, at least one hollow guide tube disposed inside said core and permitting the passage of a coolant therethrough, a coolant passing through said core; control rod means arranged for insertion into said core and vertically movable with respect to said core; control rod driving means for driving said control rod means vertically with respect to said core; said control rod means including absorber rod means disposed in a neutron absorption region of said control rod means and an elongated hollow sleeve in series with said neutron absorption region below said neutron absorption region, neutron absorber encased in said absorber rod means, said elongated hollow sleeve being filled with a gas and hermetically sealed with respect to said coolant, the interior of said elongated hollow sleeve having a vertical length extending from 10% to 100% of the vertical length of said core region, having a total volume greater than the total volume of all of the neutron absorber of said absorber rod means disposed in said neutron absorption region, the interior of said elongated hollow sleeve being void of coolant and solid material, said elongated hollow sleeve enabling an increase of core reactivity of said fast breeder reactor when positioned within said core region.

4. A fast breeder reactor according to claim 3, wherein the interior of said absorber rod means communicates with the interior of said elongated hollow sleeve through an opening.

* * * * *